United States Patent
Okamiya et al.

(10) Patent No.: US 6,559,573 B2
(45) Date of Patent: May 6, 2003

(54) SPINDLE MOTOR AND PIVOT ASSEMBLY (75) Inventors: Akio Okamiya, Miyota-machi (JP);
Toshisada Koyama, Miyota-machi (JP)

(73) Assignee: Minebea Co., Ltd., Kitasaku-gun (JP)

( * ) Notice: Subject to any disclaimer, the term of this patent is extended or adjusted under 35 U.S.C. 154(b) by 0 days.

(21) Appl. No.: 09/809,225

(22) Filed: Mar. 16, 2001

(65) Prior Publication Data
US 2002/0047389 A1 Apr. 25, 2002

(30) Foreign Application Priority Data
Jul. 18, 2000 (JP) .................... 2000-217407

(51) Int. Cl.[7] .................. H02K 1/02; C22C 38/38; C22C 38/58
(52) U.S. Cl. .............. 310/261; 310/67 R; 148/306; 148/307; 148/320; 148/325; 148/337
(58) Field of Search ................ 148/316, 317, 148/318, 319, 306, 307, 310, 320, 325, 336, 337; 310/67 R, 261

(56) References Cited

U.S. PATENT DOCUMENTS 5,437,742 A * 8/1995 Siga et al. .................. 148/335
6,072,661 A * 6/2000 Schirle .................. 360/99.08
6,358,333 B1 * 3/2002 Tanaka et al. .............. 148/318

* cited by examiner

Primary Examiner—Burton S. Mullins
(74) Attorney, Agent, or Firm—Oliff & Berridge, PLC (57) ABSTRACT

A shaft 2 of a spindle motor is composed of a steel material including 0.20 wt % of C, 0.35 wt % of Si, 8.00 wt % of Mn, higher than 0 and equal to or less than 0.05 wt % of P, 0.15 wt % of S, higher than 0 and equal to or less than 2.00 wt % of Ni and 14.00 wt % of Cr and the remainder substantially being Fe. The steel material has corrosion resistance with no plating requirement and wear resistance with no need for a heat treatment and/or a soft nitriding. Further, when considering a conventionally employed stainless steel, Pb has been frequently added thereto in order to improve machinability. On the contrary, the steel material according to the embodiments of the present invention is Pb-free material.

Since the shaft of the spindle motor is manufactured by a material high in its wear resistance, corrosion resistance and workability and in which the generation of the out gas of sulfur and sulfur compounds is suppressed low, the qualities of electronic devices and communication devices, etc. for a personal computer can be improved.

4 Claims, 7 Drawing Sheets

| | Cutting Powder Thickness | Surface Roughness | Dispersion |
|---|---|---|---|
| (a) | 60μm | 4.9μm | 1.3μm |
| (x) | 75μm | 1.8μm | 0μm |

FIG. 4

Resistance Force Against Drilling (N)

FIG. 5

Cold Working Rate (%)

FIG. 6

Degrees of Corrosion Generation

| Materials | 24 hours | 96 hours | 120 hours |
|---|---|---|---|
| (x) | No Corrosion Generation | No Corrosion Generation | Minor Smeared Corrosion |
| (c) | No Corrosion Generation | No Corrosion Generation | Spotted Corrosion uniformly generated on the entire periphery |
| (a) | No Corrosion Generation | Corrosion Generation | Corrosion Generation in 96 hours but no subsequent progress |

FIG.9

| Materials | 4 hours | 8 hours | 48 hours | 168 hours |
|---|---|---|---|---|
| (x) | No Corrosion Generation | No Corrosion Generation | Corrosion Generation from the bottom of cutting parts | Progress of Corrosion |
| (c) | No Corrosion Generation | No Corrosion Generation | No Corrosion Generation | Corrosion Generation in cutting end parts |
| (a) | No Corrosion Generation | Corrosion Generation. | Presence of Corrosion | Progress of Corrosion |

SPINDLE MOTOR AND PIVOT ASSEMBLY

BACKGROUND OF THE INVENTION

1. Field of the Invention

The present invention relates to a spindle motor and a pivot assembly composed of steel-made parts excellent in the following characteristics: wear resistance, corrosion resistance and high workability.

2. Description of the Related Art

A high degree of rotating accuracy is demanded in a spindle motor and a pivot assembly or the like applied to computer peripheral devices, such as a hard disk drive (HDD), a floppy disk drive (FDD) and a printer. Further, office automation devices, such as a facsimile terminal equipment, are also required to satisfy the above demand. A component for a shaft of a spindle motor, and a shaft and a sleeve of a pivot assembly requires a high-dimensional accuracy to achieve such a rotating accuracy. The usage of a highly workable material is expected to improve the dimensional accuracy of the parts. Because the computer peripheral devices and the office automation devices are employed under various environments depending on users, the component material for the shaft of the spindle motor, and the shaft and the sleeve of the pivot assembly or the like need to secure the certain value of wear and corrosion resistance.

For satisfying the above conditions, various kinds of stainless steels or heat-treated steels have been conventionally applied for manufacturing the shaft of the spindle motor, the shaft and the sleeve of the pivot assembly or the like. However, an austenitic stainless steel having corrosion resistance has been expensive and has not completely satisfied the requirements of hardness and wear resistance. For a martensitic stainless steel hardness and wear resistance become improved through a heat treatment; however, corrosion resistance and workability become degraded, so that a surface treatment is required for improving corrosion resistance and for suppressing out-gas. Besides, the addition of lead (Pb) has been required to make the steel further workable.

Still further, a more workable steel is expected by increasing the required sulfur content. The heat treatment increases its hardness, wear resistance while retaining corrosion resistance. Out-gas suppression could not be achieved without employing the surface treatment. However, the following extra cost has not been avoided due to the additional process of the surface treatment: the additional manufacturing cost for the surface treatment and for environmental countermeasures over the surface treatment.

Although a high manganese steel has been developed for the above materials, the high manganese steel's wear resistance and hardness are unsuitable for the invention. Therefore, the following countermeasures have been taken: a heat treatment to the high manganese steel for improving wear resistance and/or the addition of sulfur to materials making the workability more preferable or the like. However, these countermeasures result in the generation of the out-gas of sulfur and sulfur compounds (hydrogen sulfide, sulfur dioxide, etc.) out of the materials when finished products are employed. Consequently, the reliability of the shaft of the spindle motor, the shaft and the sleeve of the pivot assembly or the like will be lowered.

SUMMARY OF THE INVENTION

The invention in the light of the above-described problems has an object to achieve a qualitative improvement for a computer, peripheral devices thereto and office automation devices by manufacturing a shaft of a spindle motor and a shaft and a sleeve of a pivot assembly with a material high in wear resistance, corrosion resistance and workability and in which the generation of the out-gas of sulfur and sulfur compounds is equivalent to or less than conventional austenitic steel or both heat and surface treated martensitic steel.

In order to achieve the above-described object, a spindle motor according to the present invention is provided with a shaft composed of a material high in wear resistance, corrosion resistance and workability and in which the generation of the out gas of sulfur and sulfur compounds is suppressed low.

Further, in the spindle motor according to the present invention, a steel material including 0.20 wt % of C, 0.35 wt % of Si, 8.00 wt % of Mn, higher than 0 and equal to or less than 0.05 wt % of P, 0.15 wt % of S, higher than 0 and equal to or less than 2.00 wt % of Ni and 14.00 wt % of Cr and the remainder substantially being Fe is employed.

Further, the spindle motor according to the invention does not contain Pb.

Further, in order to achieve the above-described object, a pivot assembly according to the invention is provided with a sleeve and a shaft composed of a material high in wear resistance, corrosion resistance and workability and in which the generation of the out gas of sulfur and sulfur compounds is equivalent to or less than conventional austenitic steel or both heat and surface treated martensitic steel.

Still further, in the pivot assembly according to the present invention, a steel material including 0.20 wt % of C, 0.35 wt % of Si, 8.00 wt % of Mn, higher than 0 and equal to or less than 0.05 wt % of P, 0.15 wt % of S, higher than 0 and equal to or less than 2.00 wt % of Ni and 14.00 wt % of Cr and the remainder substantially being Fe is employed.

Further, the pivot assembly according to the invention does not contain Pb.

BRIEF DESCRIPTION OF THE DRAWINGS

Other characteristics can be referred from the attached drawings in which.

DETAILED DESCRIPTION OF THE PREFERRED EMBODIMENTS

Hereinafter, embodiments of the present invention will be described with reference to the accompanying drawings.

Figure 1:
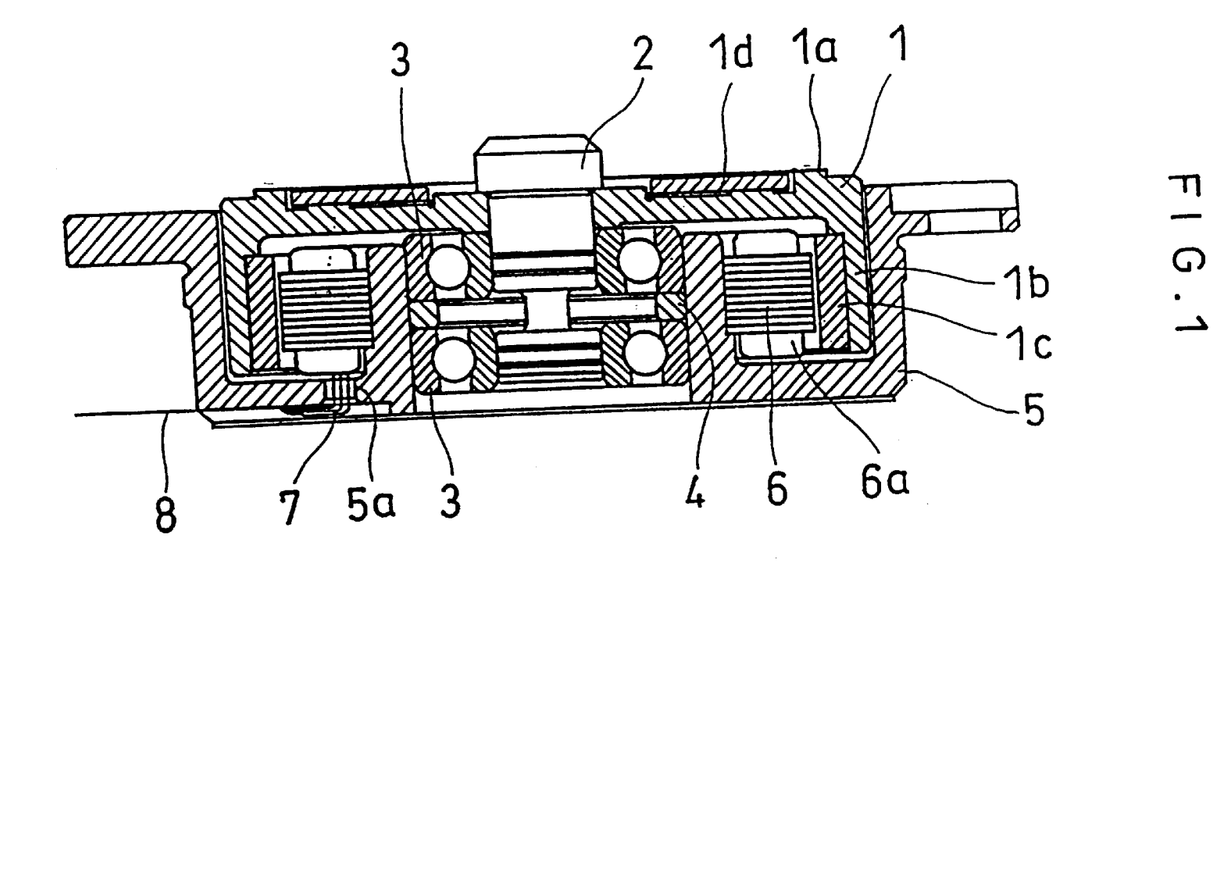
FIG. 1 is a sectional view showing one example of a spindle motor according to a first embodiment of the present invention.

FIG. 1 shows one example of a spindle motor according to a first embodiment of the present invention, which is for a so-called removable type disk drive (ZIP) wherein a disk as a recording medium can be exchanged according to a usage situation. Further, the spindle motor shown in FIG. 1 is, what is called, a "shaft rotatable type" spindle motor in which a shaft 2 is fixed to a rotor 1 and the shaft 2 is supported by a housing 5 through bearings 3.

The rotor 1 has a discal disk mount surface 1a and an outer peripheral cylindrical part 1b formed integrally with its peripheral end part. A magnet 1c is fixed to an inner wall of the outer peripheral cylindrical part 1b. The shaft 2 illustrated in FIG. 1 is press-fined into and fixed to a central part of the rotor 1; however, the shaft 2 may be integrally formed as a part of the rotor 1 as another example. Moreover, because the spindle motor illustrated is for the ZIP, the disk mount surface 1a is also provided with a magnet 1d serving as a disk damper.

Further, the spindle motor shown in FIG. 1 has two bearings 3 so as to sandwich a spacer 4 therebetween in order to enhance the rotating accuracy of the rotor 1. A stator 6 is fixed to the housing 5 to which outer rings of the bearings 3 are fixed. Lead wires 7 for feeding electric power to a coil 6a supported by the stator 6 pass through an opening 5a formed in the housing 5 and is connected to a flexible printed circuit board (FPC) 8 by soldering or the like. Besides, the spindle motors for the disk drives are not limited to those for the ZIP but have substantially similar structures.

According to the first embodiment of the invention, the shaft 2 is formed with a material high in wear resistance, corrosion resistance and workability and in which the generation of the out-gas of sulfur and sulfur compounds is equivalent to or less than conventional austenitic steel or both heat and surface treated martensitic steel. The above described material is a steel material including 0.20 wt % of C, 0.35 wt % of Si, 8.00 wt % of Mn, higher than 0 and equal to or less than 0.05 wt % of P, 0.15 wt % of 5, higher than 0 and equal to or less than 2. 00 wt % of Ni and 14.00 wt % of Cr and the remainder substantially being Fe. And, this material does not include Pb.

The content of C is set to the above value since the increase of the content of C serves the suppression of the generation of corrosion or the like and a machinability enhancement. Further, Si which functions as a deoxidizer similar to Al is added to the material. And, the content of Si is set approximately to 0.35 wt % since Si has the same property as Al, which deteriorates corrosion resistance. Mn is an essential component to form a steel structure into an austenitic structure, so that 8.00 wt % of Mn is added to the material. The above-indicated values are determined in consideration of the content of C.

Although P lowers frictional coefficient of a steel material, it also forms a local battery deteriorating corrosion resistance, so that the least addition of P is preferable. S effectively serves the machinability improvement. However, similar to P, S forms the local battery causing corrosion in the steel material, it is thereby not preferable in consideration of corrosion resistance. Further, when a finished product is considered, S causes the out gas of sulfur and sulfur compounds generating from the material. Thus, the adding amount of S is set to 0.15 wt % according to the first embodiment of the present invention.

Ni is added to the material since it is a component forming an austenitic structure like Mn; however, its adding amount is set to 2.00 wt % or less. The effect of Ni addition becomes prominent from 1 wt % or so, but the addition of a large quantity of Ni will lead the manufacturing cost of the material as an alloy to greatly increase, so that the cost performance of the present invention will be lowered.

Cr is a component which contributes to develop corrosion resistance, particularly saline resistance due to the formation of a passivation film. Further, the addition of Cr can help to improve a tensile strength, to raise a yield point and to enhance the strength of the steel material. Still further, the addition of Cr acts to decrease the degradation caused by welding, so that weldability is thereby improved. However, the adding amount of Cr should be determined in consideration of the manufacturing cost.

Further, the material may possibly include 0.20 wt % of N, higher than 0 and equal to or less than 0.10 wt % of Al, higher than 0 and equal to or less than 3.0 wt % of Mo and higher than 0 and equal to or less than 3.0 wt % of Cu. Note that in case Al exists as an aluminum oxide, it will accelerate the progress of corrosion, and therefore the amount of Al is set to higher than 0 and equal to or less than 0.10 wt %. Further, Al is provided as a carbide so as to improve corrosion resistance.

Mo serves to raise the yield point of a tensile strength, to enhance electrochemical corrosion resistance or other corrosion resistances and to improve characteristics, especially to a salt spray test. However, if the content of Mo exceeds 5 wt %, the manufacturing cost of the material as an alloy is accordingly increased, resulting in losing the effect of the steel material in the invention. Thus, the amount of Mo in the first embodiment of the invention is set to higher than 0 and equal to or less than 3.0 wt %. Further, in order to improve cold workability, higher than 0 and equal to or less than 3.0 wt % Cu may be included in the material.

The steel material with the above-described component ratio has corrosion resistance with no plating requirement and wear resistance with no heat treatment and/or soft-nitriding requirement. In the case of a conventional stainless steel, Pb has been frequently added to the material in order to improve machinability. However, the steel material according to the embodiments of the present invention does not include Pb, and hence it corresponds to a Pb-free material. Further, the material hardness can be set depending on its use within a range of Hv 250 to 500, and the surface roughness of a cut surface thereof will be more desirable compared to that of the stainless steel (SUS303). In respect of the tensile strength, the steel material has a high tensile strength of about 1.6 times (800 to 1000 N/mm$^2$) higher than the stainless steel (SUS303). The machinability of the steel material by a lathe is better than that of the stainless steel (SUS303). These characteristics can be achieved by adding a very small amount of C and S to steel mainly including 8 wt % of Mn and 14 wt % of Cr to stabilize an austenitic structure and by distributing very fine MnS uniformly therein.

Accordingly, the above-described steel material is used as a material for the shaft 2, so that a certain workability, wear resistance and corrosion resistance can be provided. Thus, an environmental degradation due to the heat treatment and the plating treatment or the generation of the out gas of sulfur and sulfur compounds resulting from the components of the material can be suppressed. Hence, the spindle motor with a high accuracy and a high reliability can be provided at low cost.

Figure 2:
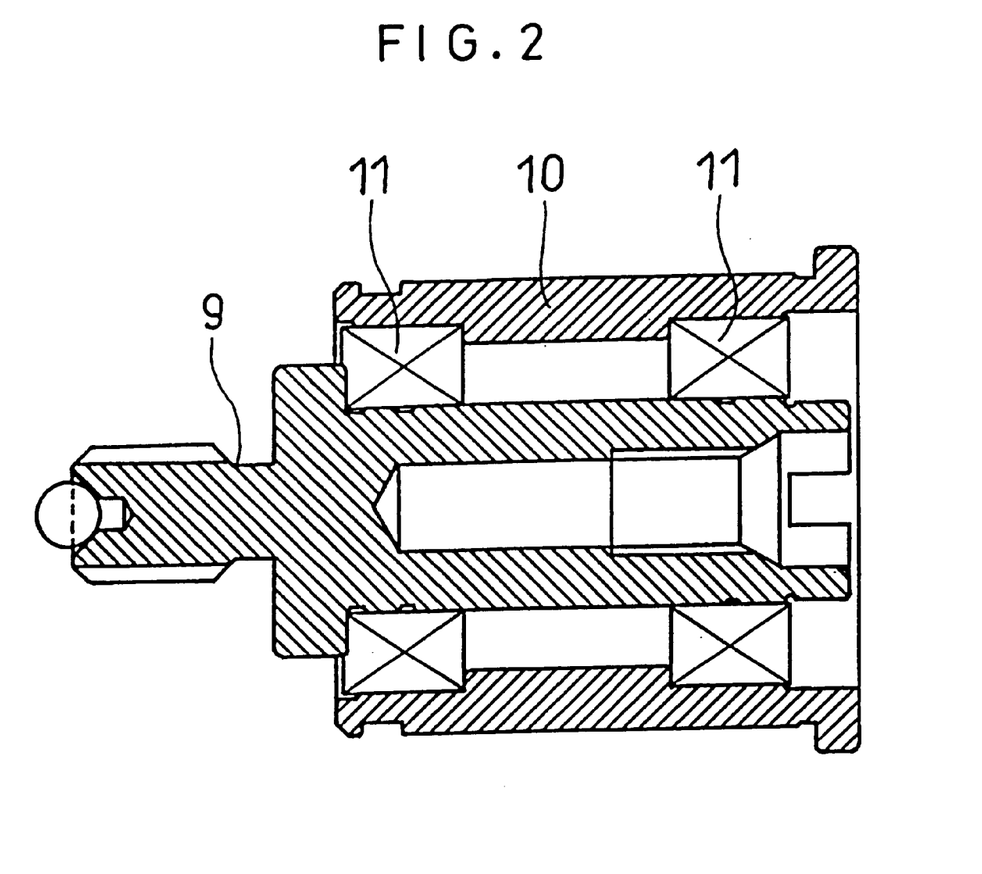
FIG. 2 is a sectional view showing one example of a pivot assembly according to a second embodiment of the present invention.

FIG. 2 shows one example of a pivot assembly according to a second embodiment of the present invention. In the pivot assembly, the steel material employed for the shaft 2 of the spindle motor according to the first embodiment of the present invention is used for both a shaft 9 and a sleeve 10. The shaft 9 and the sleeve 10 are rotatable to each other through bearings 11 and usually used for electronic devices of a computer such as an HDD or an FDD, a swing arm of a disk storage device incorporated in peripheral devices thereof, etc.

The above-described material is employed for the pivot assembly, so that a certain workability, wear resistance and corrosion resistance can be achieved, and an environmental degradation due to a heat treatment and surface treatment, and the generation of the out gas of sulfur and sulfur compounds resulting from the components of the material can be suppressed. Therefore, a highly accurate and reliable pivot assembly can be provided at low cost.

Next, the evaluation results of the steel material according to the present invention will be described hereinafter.

The components of the steel material used in the examples include 0.20 wt % of C, 0.35 wt % of Si, 8.00 wt % of Mn, higher than 0 and equal to or less than 0.05 wt % of P, 0.15 wt % of S, higher than 0 and equal to or less than 2.00 wt % of Ni and 14.00 wt % of Cr and the remainder substantially being Fe. As a comparative example to the above-indicated steel material, the following materials used for component parts such as the shaft of the spindle motor and the shaft and the sleeve of the pivot assembly, etc. are mentioned. The following denotations are used hereinbelow: (X) for the steel material used in the examples, (a) for SUS416, (b) for SUS304, (c) for SUS303, (d) for SUS430F, (e) for S45C, (f) for a non-magnetic high hardness material DSH400F and (g) for an SUM24L nitrided material.

Figure 3:
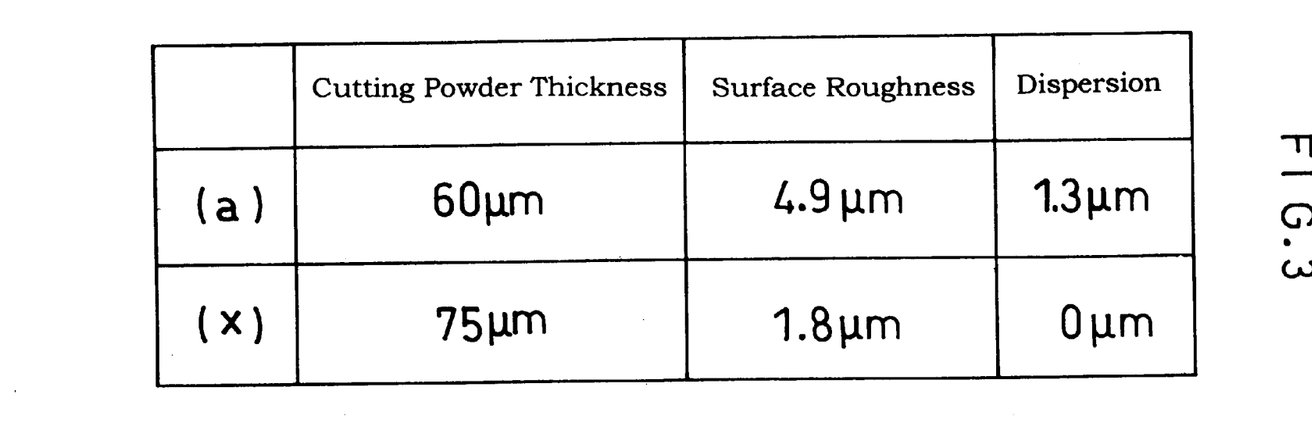
FIG. 3 is a table showing the examination results of the machinability of steel materials in the embodiment of the present invention and a comparative example.

Initially, FIG. 3 shows the examination results of machinability. The rotating speed of a lathe in the comparison test is 2650 rpm, circumferential velocity is 50 m/s and a feeding amount of a bite is 25 $\mu$m. As shown in FIG. 3, the results of the steel material (X) applied in the example indicate more preferable value compared to the SUS416 denoted by (a) of surface roughness and dispersion. Specifically, as for dispersion, the steel material (X) achieves 0 $\mu$m. Although the steel material (X) shows a slightly larger value than that of (a) of a cutting powder thickness, the state is in a good condition, so that a overnight production under an unmanned operation will be possible.

Figure 4:
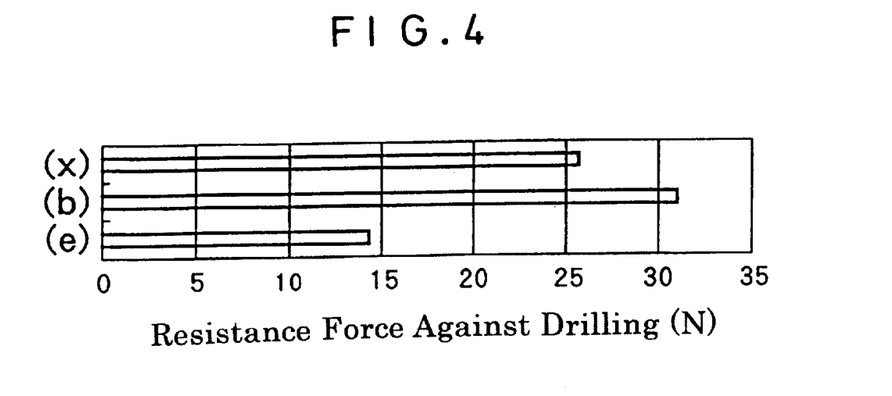
FIG. 4 is a graph showing the examination results of drilling workability of the steel materials in the embodiment of the present invention and the comparative examples.

Next, FIG. 4 shows the examination results of drilling workability. The rotating speed of a drill in this comparison test is 500 rpm, a feeding amount is 0.07 mm/rev, a feeding speed is 35 mm/min., and a feeding depth is 10 mm. As shown in FIG. 4, the steel material (X) applied in the example shows a lower value when comparing to the S45C denoted by (e). However, the value of a resistance force of the steel material (X) is smaller than that of the SUS304 denoted by (b), and the drilling workability of the steel material (X) is in a good condition.

Figure 5:
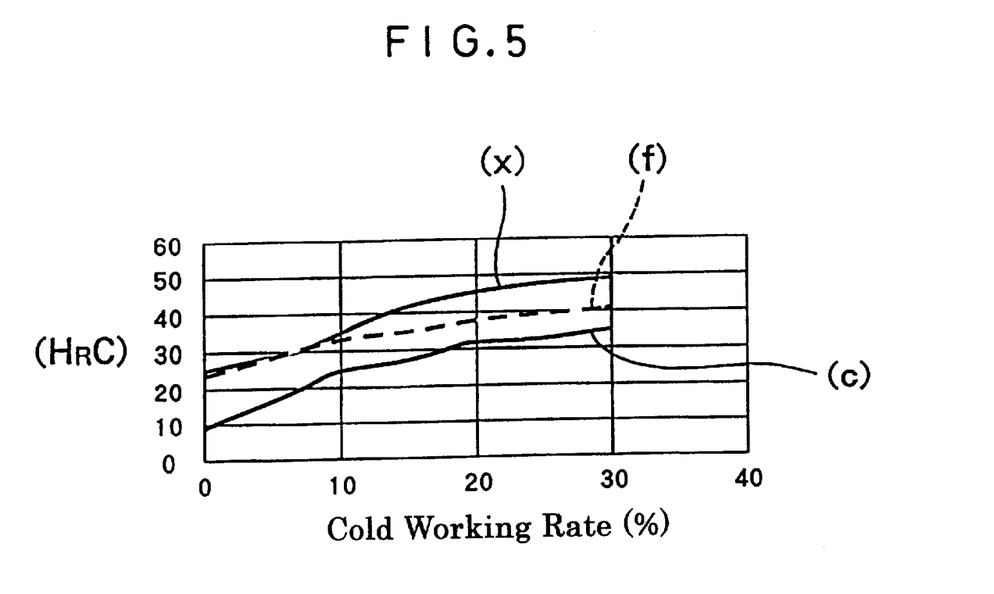
FIG. 5 is a graph showing the relation between cold workability and hardness in the steel materials in the embodiment of the present invention and the comparative examples.

Next, FIG. 5 shows a relation between a cold working rate and hardness. As shown in FIG. 5, the steel material (X) applied in the example begins to increase its hardness according to the rising cold working rate, and the value of hardness of the steel material (X) reaches approximately $H_RC40$ when the cold working rate comes to 15%. Then, the value of hardness of the steel material gradually becomes larger as the cold working rate increases and reaches approximately $H_RC48$ at 25% of the cold working rate. As a result, the steel material (X) obtains hardness higher than that of the non-magnetic high hardness material DSH400F and the SUS303 denoted respectively by (f) and (c).

Figure 6:
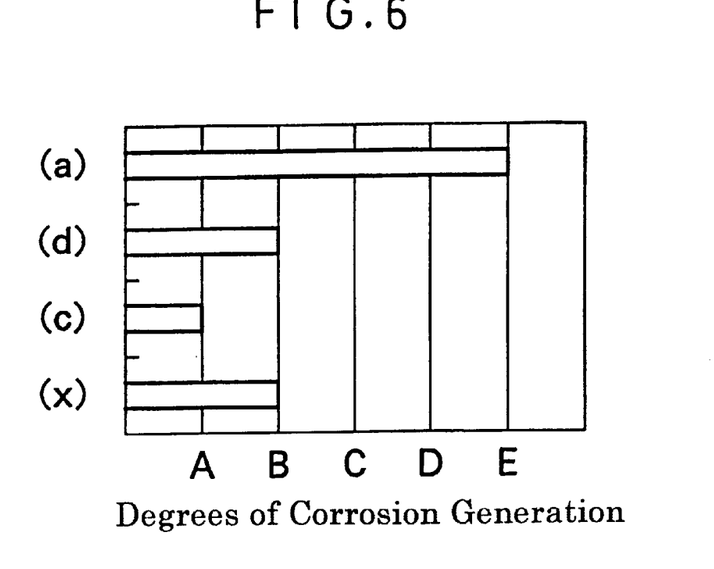
FIG. 6 is a graph showing the comparison results of a corrosion resistance test (a saline aerification test) in the steel materials in the embodiment of the present invention and the comparative examples.

FIG. 6 shows the comparison results of a corrosion resistance test (a salt spray test). The degrees of corrosion generation are represented by the following ranks; A: not corroded, B: hardly corroded, C: a little corroded, D: corroded and E: considerably corroded. When considering this case, the SUS303 denoted by (c) shows more preferable value than the steel material (X) used in the example; however, the (X) obtains the corrosion resistance (rank B) equal to the SUS430F denoted by (d). Moreover, test results regarding the environmental test and the salt spray test are shown in FIGS. 8 and 9 in detail.

Figure 7:
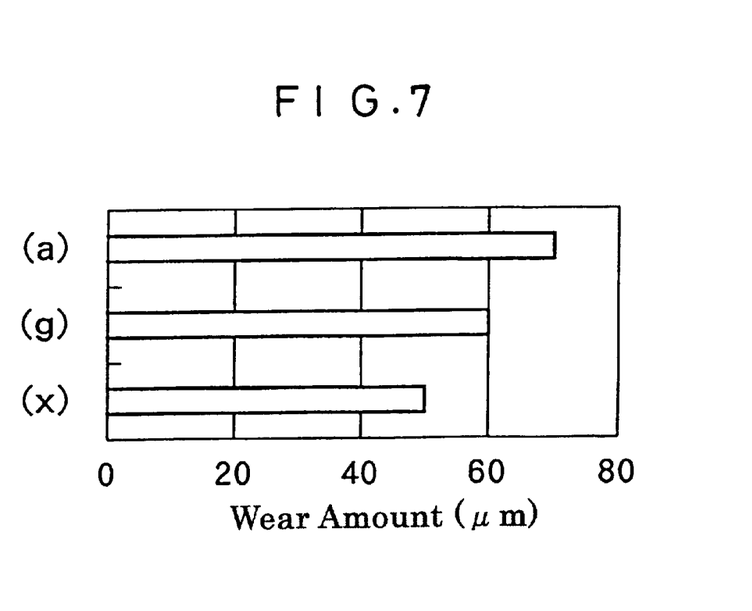
FIG. 7 is a graph showing the comparison results of a sliding wear test in the steel materials of the embodiment of the present invention and the comparative examples.

FIG. 7 shows the comparison results of a sliding wear test. As the figure clearly shows, the steel material (X) used in the example has wear loss smaller than that of the SUM24L nitrided material denoted by (g) and the SUS416 denoted by (a), thereby providing high wear resistance.

Figure 8:
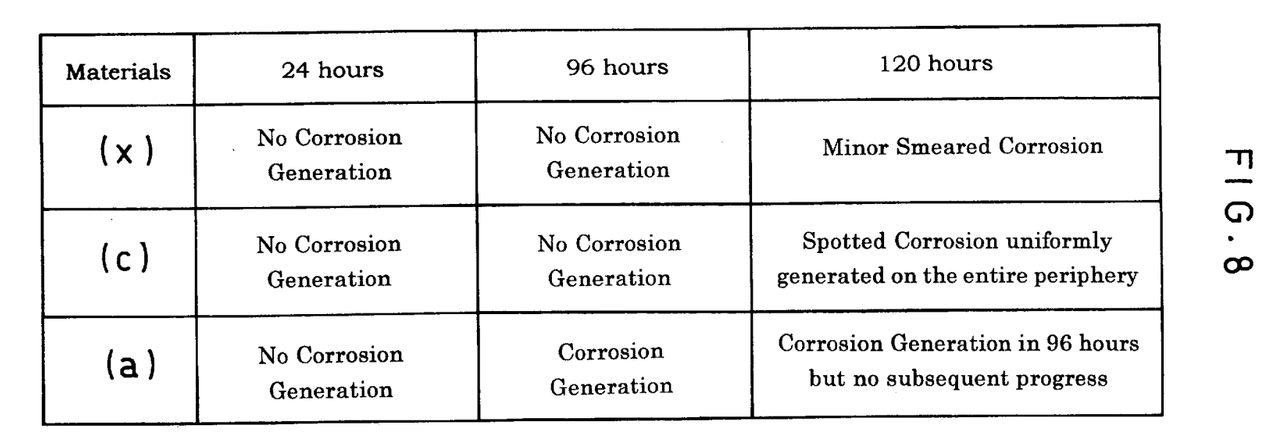
FIG. 8 is a table showing the comparison results of an environmental test with the lapse of time in the steel materials of the embodiment of the present invention and the comparative examples.
Figure 9:
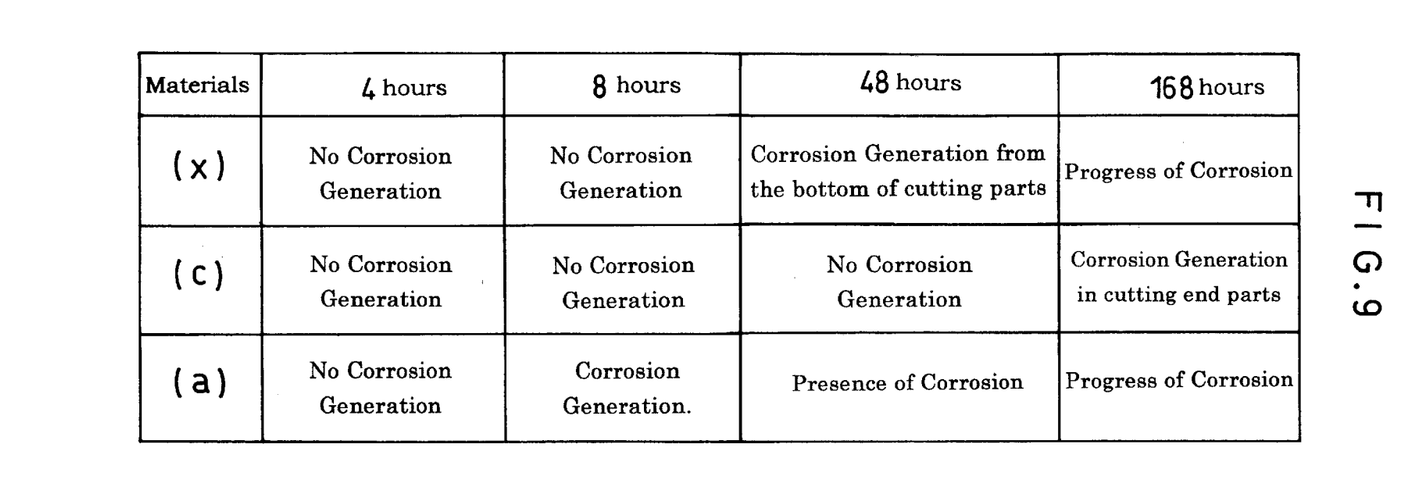
FIG. 9 is a table showing the comparison results of a corrosion resistance test with the lapse of time in the steel materials of the embodiment of the present invention and the comparative example.

FIG. 8 shows the comparison results of an environmental test. The environmental test is conducted under the condition of a temperature of 80° C. and a humidity of 95%. The SUS416 denoted by (a) has corrosion generated in 96 hours; however, the corrosion is not subsequently progressed. In this case, the corrosion generation was recognized in cutting traces (pin holes formed due to falling of MnS upon cutting) when observing the enlarged cutting part of a test piece. On the contrary, the SUS303 denoted by (c) has uniformly-generated spotted corrosion on the entire periphery in 120 hours. In the steel material (X) used in the example, smeared corrosion was generated in cutting parts in 120 hours.

And, the falling traces of sulfide (MnS) were recognized in the SUS303 denoted by (c) and the SUS416 denoted by (a) in the cutting parts of the test piece before performing the test while the steel material (X) in the example had no traces, which is regarded as one of the factors for good results produced in the environmental test.

FIG. 9 shows the comparison results of a corrosion resistance test. The corrosion resistance test is performed under the condition of a temperature of 35° C. and 5% of NaCl. In the SUS416 denoted by (a), corrosion is generated in 8 hours and the growth of corrosion can be observed with the lapse of time in both the cutting part and the grinding part of the test piece. The SUS303 designated by (c) has corrosion in the cutting end parts of the test piece in 168 hours. When considering the steel material (X) used in the example, it takes 48 hours to generate corrosion in the bottom of the cutting parts of the test piece, and the corrosion spreads to parts where salt water falls out with the lapse of 168 hours. Although the steel (X) did not perform perfect corrosion resistance capability under permeation state (in seawater or the like), the results completely ensure corrosion resistance under use in the applicable fields of the invention such as electronic devices of a personal computer, a facsimile terminal equipment (GA device), etc.

The invention, as described above, has the following effects. Specifically, the spindle motor according to the invention is provided with the shaft made of a material high in its wear resistance, corrosion resistance and workability and in which the generation of the out-gas of sulfur and sulfur compounds is equivalent to or less than conventional austenitic steel or both heat and surface treated martensitic steel. It is therefore possible to improve the qualities of electronic devices for a computer, such as an HDD, an FDD, GA devices, etc. Further, the pivot assembly according to the invention is provided with the shaft and the sleeve made of a material high in its wear resistance, corrosion resistance and workability and in which the generation of the out gas of sulfur and sulfur compounds is equivalent to or less than conventional austenitic steel or both heat and surface treated martensitic steel, so that the qualities of the computer, the peripheral devices thereof and the GA devices, etc. can be improved.

What is claimed is:

1. A spindle motor provided with a shaft composed of a steel material including 0.20 wt % of C, 0.35 wt % of Si, 8.00 wt % of Mn, higher than 0 and equal to or less than 0.05 wt % of P, 0.15 wt % of 5, higher than 0 and equal to or less than 2.00 wt % of Ni and 14.00 wt % of Cr and the remainder substantially being Fe.

2. The spindle motor according to claim 1, wherein said material does not include Pb.

3. A pivot assembly provided with a sleeve and a shaft composed of a material steel material including 0.20 wt % of C, 0.35 wt % of Si, 8.00 wt % of Mn, higher than 0 and equal to or less than 0.05 wt % of P, 0.15 wt % of S, higher than 0 and equal to or less than 2.00 wt % of Ni and 14.00 wt % of Cr and the remainder substantially being Fe.

4. The pivot assembly according to claim 3, wherein said material does not include Pb.

* * * * *